United States Patent [19]

Rocklin

[11] 3,856,589
[45] Dec. 24, 1974

[54] FLUORINE-CONTAINING ORGANIC CARBONATE

[75] Inventor: Albert L. Rocklin, Walnut Creek, Calif.

[73] Assignee: Shell Oil Company, New York, N.Y.

[22] Filed: Oct. 12, 1970

[21] Appl. No.: 81,634

[52] U.S. Cl.............. 149/109.4, 149/19.44, 260/463
[51] Int. Cl....................... C06b 15/00, C07c 69/00
[58] Field of Search........... 149/19, 20, 42, 44, 109, 149/19.3; 260/463

[56] References Cited
UNITED STATES PATENTS
3,461,162   8/1969   Koshar et al.................... 260/463 X

*Primary Examiner*—Leland A. Sebastian
*Attorney, Agent, or Firm*—Henry C. Geller

[57] ABSTRACT

Di[2,3-bis(difluoramino)propyl] carbonate of a high degree of purity and its use as a high-energy plasticizer of polymeric binders for solid propellant systems.

3 Claims, No Drawings

FLUORINE-CONTAINING ORGANIC CARBONATE

The Invention herein described was made in the course of or under a contract or subcontract thereunder, with the United States Air Force.

BACKGROUND OF THE INVENTION

High-energy polymers used as high-energy binders for solid propellant systems are generally viscous liquids which require a plasticizer in order to mix, cast, and cure to propellants with acceptable physical properties. Difluoramino-containing compounds which are per se energetic have been used as plasticizers. Since difluoramino compounds tend to be highly sensitive to shock and friction, it would be advantageous to minimize this unwelcome contribution to the hazards of propellant formulation by having available a highly energetic difluoramino plasticizer having reduced shock and friction sensitivity.

SUMMARY OF THE INVENTION

It has now been found that di[2,3-bis(difluoramino)propyl] carbonate of a high degree of purity, characterized by having a refractive index, $n^{25}_D$, of up to 1.3990, is a highly energetic difluoramino plasticizer having reduced shock and friction sensitivity. Heretofore, the di[2,3-bis(difluoramino)propyl] carbonate available was a material of high shock sensitivity and poor thermal stability, rendering it undesirable as a high-energy plasticizer of polymeric binders for solid propellant systems.

PREFERRED EMBODIMENTS OF THE INVENTION

One criterion of stability of an energetic material is impact sensitivity, which is conveniently measured in units of kg-cm, where increasing values indicate increasing stability, e.g., nitroglycerine has an impact sensitivity of 2 kg-cm.

Di[2,3-bis(difluoramino)propyl] carbonate is produced conventionally by difluoraminating diallyl carbonate in an inert solvent with tetrafluorohydrazine ($N_2F_4$) and subsequently separating to obtain clear, colorless liquid di[2,3-bis(difluoramino)propyl] carbonate, identifiable by elemental and nuclear magnetic resonance analyses, having an impact sensitivity in the range of about 6 to 10 kg-cm.

The di[2,3-bis(difluoramino)propyl] carbonate of the invention is characterized by having a refractive index, $n^{25}_D$, of up to 1.3990. The carbonate of the invention unexpectedly exhibits such improved stability that its impact sensitivity is in the range of about 20 to 22 kg-cm. The relationship between refractive index and stability of di[2,3-bis(difluoramino)propyl] carbonate has been found to be an inverse one, i.e., the lower the refractive index, the higher is the stability. The di[2,3-bis(difluoramino)propyl] carbonate of the invention is produced by reacting tetrafluorohydrazine ($N_2F_4$) with diallyl carbonate in the presence of an inert solvent, thereafter passing the resulting solution through a plurality of bodies comprising as a minimum at least one body of adsorbent material and at least one body of acidic ion, i.e., cation, exchange resin, and thereafter recovering the desired highly pure product of refractive index, $n^{25}_d$, of up to 1.3990. The refractive index depends on the wavelength of light and on the temperature, which are conventionally specified with subscripts and superscripts, respectively. Thus, $n^{25}_D$ indicates a refractive index taken with the monochromatic yellow D light of the sodium arc at a temperature of 25°. For the purposes of the invention, all temperature values in this specification are given in degrees Centigrade unless otherwise labelled.

The diallyl carbonate starting reactant is obtained conveniently from the reaction of phosgene with excess allyl alcohol. The difluoramination of, i.e., the addition of tetrafluorohydrazine to, diallyl carbonate is conducted at a temperature of from about 65 to about 125°, preferably at about 70 to about 80°. The difluoramination is conducted in the presence of an inert organic solvent. Solvents that are suitable are those capable of dissolving the reactants and are inert to the reactants and the di[2,3-bis(difluoramino)propyl] carbonate prepared therefrom. Exemplary solvents are normally liquid ethers, including dialkyl ethers such as diethyl ether, dibutyl ether, and methyl hexyl ether; alkyl aryl ethers such as anisole and phenyl butyl ether; cyclic ethers such as tetrahydrofuran, dioxane, and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether, and glycerol triethyl ether; normally liquid aromatic hydrocarbons, such as benzene, toluene, and xylene; dialkyl ketones such as acetone, methyl ethyl ketone, methyl ethyl ketone, methyl isobutyl ketone, methyl isopropyl ketone, ethyl propyl ketone, and diethyl ketone; and halogenated hydrocarbons such as dichloromethane, chloroform, carbon tetrachloride, dichloroethane, tetrachloroethane, bromoform, dibromoethane, chloropropane, bromobutane, 1-chloro-2,2-difluoroethane, chloropentane, chlorobenzene, chlorocyclohexane, and the like. The solvent is employed in molar excess over the amount of total reactants, and, in general, moles of solvent up to about 150 moles per mole of total reactants are satisfactory. A particularly preferred group of solvents includes ketones and halogenated hydrocarbons of up to 6 carbon atoms, especially dialkyl ketones and chlorohydrocarbons, and most preferred is acetone and 1,2-dichloroethane.

The reaction solution resulting from the above difluoramination of diallyl carbonate is then treated by passage through a plurality of bodies. As a minimum the resulting solution is passed through a body of adsorbent material and a body of acidic ion, i.e., cation, exchange resin. The order of passage is not critical in that passage may be first through the body of adsorbent material and then through the body of cation exchange resin or vice versa. The resulting solution may be passed through more than one of each kind of the treating materials. By way of illustration, the solution is passed through a body of adsorbent material, e.g., activated charcoal, thereafter through a body of a second adsorbent material, e.g., silica gel, and thereafter through a body of cation exchange resin, e.g., Amberlyst 15. Alternatively, passage through a body of one adsorbent material may be combined with passage through bodies of two different cation exchange resins. Exemplary of the suitable adsorbent materials for use in producing the carbonate of the invention are silica gels, activated carbon, molecular sieves and the like; particularly perferred are the silica gels. The body of adsorbent material is preferably maintained in subdivided form. The ion exchange resins suitable for use in producing the carbonate of the invention are cationic exchange resins, which may be employed either in their salt form, e.g., as the sodium salt thereof, or in their acidic form, i.e., their hydrogen form, the latter being preferred. Exemplary of suitable cation exchange resins are sulfonated phenol-formaldehyde resins, sulfonated copolymers of monovinyl aromatic hydrocarbons and polyvinyl aromatic hydrocarbons such as are disclosed in U.S. Pat. No. 2,366,007 and carboxylic acid resins such as are disclosed in U.S. Pat. No. 2,471,818 the last named being preferred. Exemplary of cation exchange resins containing carboxylic acid groups as the functional groups thereof and conveniently available commercially are Permutit H-70 (The Permutit Co.), Amberlite IRC-50 (Rohm and Haas Co.), Duolite CS-101 (Chemical Process Co.), Amberlyst 15 (Rohm and Haas Co.), and the like. The body of acidic ion exchange resin is preferably maintained in granular form and utilized as a bed of resin. The plurality of bodies described hereinabove may be utilized as distinctive layers in a single column or intermixed therein or as like material in a plurality of columns. The passage of the resulting solution through the plurality of bodies preferably involves the simple percolation of solution through static material. However, if desired, agitating equipment, fluidized beds, and the like may be utilized. Optionally, the same solvent is maintained throughout the difluoramination step and passage through the above-described bodies or the solvent is interchangeable such that a different one is available for each operation; that is, the solvent used in the difluoramination may be removed thereafter and a different solvent added to the reaction product to form the solution which is passed through the plurality of bodies.

After passage of the resulting solution through the plurality of bodies comprising at least one body of adsorbent material and at least one body of cation exchange resin, the desired highly pure di[2,3-bis(difluoramino)propyl] carbonate of refractive index, $n^{25}_D$, of up to 1.3990 is recovered from the solution. The recovery is conveniently carried out by conventional means such as fractional distillation, solution chromatography, and the like. By way of illustration, when recovering the carbonate of the invention by fractional distillation, the refractive index of each fraction or cut is measured. All those having a refractive index, $n^{25}_D$, of values less than or equal to 1.3990 are combined to produce the carbonate of the invention. Those fractions having a $n^{25}_D$ of value greater than 1.3990, optionally, are discarded or may be combined for recycling with additional reaction solution from other difluoramination steps for passage through the plurality of bodies heretofore described.

The di[2,3-bis(difluoramino)propyl] carbonate of the invention is utilized with advantage as a plasticizer of polymeric binders for solid propellant systems. It is especially useful when combined with poly[1,2-bis(difluoramino)-2,3-epoxypropane], which is a family of hydroxyl-terminated polyethers with a repeating unit of

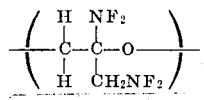

and is described in copending application of Walter L. Petty, U.S. Ser. No. 660,545, filed July 12, 1967. A particularly desirable composition is that wherein the weight ratio of di[2,3-bis(difluoramino)propyl] carbonate plasticizer of the invention to poly[1,2-bis(difluoramino)-2,3-epoxypropane] binder is about 1:1, i.e., about 50/50 wt %. Propellants formulated from poly[1,2-bis(difluoramino)-2,3-epoxypropane] plasticized with the di[2,3-bis(difluoramino)propyl] carbonate of the invention exhibit superior properties such as high true tensile values between 0°F and −20°F; high impact values, e.g., the impact sensitivity of an equal weight mixture of plasticizer and binder is greater than 100 kg-cm; significant reduction in burning rate; and such formulations yield propellant systems which are highly stable thermally.

EXAMPLE 1

A solution of 4.11 g of diallyl carbonate in 12 ml of 1,2-dichloroethane was heated to 80° under 500 psig tetrafluorohydrazine for ten hours. The solvent was stripped off and the remainder passed through a single ¾-inch by 17-inch column containing activated silica gel and then distilled at 79° and <0.1 mm to give a 75% yield of di[2,3-bis(difluoramino)propyl] carbonate, identified by elemental and nuclear magnetic resonance analysis. This carbonate is a clear, colorless, mobile liquid and has a refractive index, $n^{25}_D$, D, of 1.4006. Its impact sensitivity as measured by the Olin-Mathieson closed-cup impact testing method was 6 kg-cm.

A solution of 70 g of diallyl carbonate in 600 ml of acetone was heated to 80° for 10 hours in a 1-liter stirred autoclave under 500 psig tetrafluorohydrazine. The acetone solvent was removed using a remotely controlled high-vacuum still and replaced with 1,2-dichloroethane. The resulting solution was passed through 6 inches of silica gel on top of 12 inches of Amberlyst 15 ion exchange resin in a 1¾ inch tube. The solvent was then removed from the above-treated tube effluent. The remainder was distilled at 75–85° and at 50–70 microns. A forecut of about 5 g of material having a refractive index, $n^{25}_D$, greater than 1.3990 was discarded. 156.3 Grams, a yield of 90.7%, of di[2,3-bis(difluoramino)propyl] carbonate was obtained and had a refractive index, $n^{25}_D$, of 1.3990. Whereas the impact sensitivity of commonly used energetic plasticizers varies from about 2 to about 15 kg-cm as measured by the Olin-Mathieson closed-cup impact testing method where increasing values indicate increasing stability (e.g., nitroglycerin has a value of 2), the measured value for this carbonate is 20 kg-cm.

Example 2

A propellant formulation of the following description was prepared:

| Ingredient | Wt. % |
|---|---|
| Poly[1,2-bis(difluoroamino-2,3-epoxypropane], mol wt about 3700 (as determined by vapor phase osmometer) | 17.87 |
| Di[2,3-bis(difluoroamino)propyl] carbonate, $n_D^{25}$ ≤ 1.3990 | 17.87 |
| 1,2,6-Hexanetriol | 0.36 |
| 3,3'-Dimethyldiphenylmethane-4,4'-diisocyanate | 2.98 |
| Aluminum | 14.00 |
| Ammonium perchlorate | 46.28 |

The measured burning rate of the above propellant is 1.02 in./sec at 1000 psi, which value is significantly lower than the burning rate of 1.20 in./sec at 1000 psi of a similar propellant utilizing a control plasticizer, 1,2,3-tris[1,2-bis(difluoramino)ethoxy]propane, in place of di[2,3-bis(difluoramino)propyl] carbonate of refractive index, $n^{25}D$, of up to 1.3990.

I claim as my invention:

1. Di[2,3-bis(difluoramino)propyl] carbonate of refractive index, $n^{25}_D$, of up to 1.3990 and impact sensitivity of from about 20 to 22 kg-cm.

2. The composition consisting essentially of a mixture of poly[1,2-bis(difluoramino)-2,3-epoxypropane] and di[2,3-bis(difluoramino)propyl] carbonate of refractive index, $n^{25}_D$, of up to 1.3990.

3. The composition of claim 2 wherein the weight ratio of poly[1,2-bis(difluoramino)-2,3-epoxypropane] to said di[2,3-bis(difluoramino)propyl] carbonate is about 1:1.

* * * * *